(12) United States Patent
Bermundo

(10) Patent No.: US 10,078,798 B2
(45) Date of Patent: Sep. 18, 2018

(54) METHOD OF GENERATING TRANSFORMED PRINT JOBS

(71) Applicant: KYOCERA Document Solutions Inc., Chuo-ku, Osaka (JP)

(72) Inventor: Neil-Paul Bermundo, Glendora, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/252,293

(22) Filed: Aug. 31, 2016

(65) Prior Publication Data

US 2018/0060709 A1    Mar. 1, 2018

(51) Int. Cl.
*G06K 15/02* (2006.01)
*H04N 1/00* (2006.01)
*G06F 3/12* (2006.01)

(52) U.S. Cl.
CPC ....... *G06K 15/1807* (2013.01); *G06F 3/1206* (2013.01); *G06F 3/1225* (2013.01); *G06F 3/1227* (2013.01); *G06F 3/1248* (2013.01); *G06F 3/1255* (2013.01); *G06F 3/1268* (2013.01); *G06K 15/1836* (2013.01); *H04N 1/00411* (2013.01); *H04N 2201/0094* (2013.01)

(58) Field of Classification Search
CPC combination set(s) only.
See application file for complete search history.

(56) References Cited

U.S. PATENT DOCUMENTS

| 5,835,244 | A | 11/1998 | Bestmann | |
|---|---|---|---|---|
| 2013/0107289 | A1* | 5/2013 | Brodzinski | G06K 15/1857 358/1.9 |
| 2015/0262044 | A1* | 9/2015 | Sochi | G06K 15/1857 358/1.15 |
| 2017/0228902 | A1* | 8/2017 | Yoshimura | G06T 11/40 |
| 2017/0235532 | A1* | 8/2017 | Fan | G06F 3/1256 358/1.13 |

* cited by examiner

*Primary Examiner* — Helen Zong
(74) *Attorney, Agent, or Firm* — Basil M. Angelo; Angelo Mikeska PLLC

(57) ABSTRACT

A method of generating transformed print jobs includes inputting a page description language print job and receiving a selection of one or more transformation features and one or more transformation feature settings for each selected transformation feature. For each transformation feature selected, all dependent transformation features are identified. For each dependent transformation feature identified, all dependent feature settings are identified. All combinations of transformation features, transformation feature settings, dependent transformation features, and dependent feature settings are determined. For each combination, the inputted print job is transformed according to the transformation features, transformation feature settings, dependent transformation features, and dependent feature settings of the combination and a transformed print job is outputted.

20 Claims, 15 Drawing Sheets

100

505

| PDL Cmds or Features | Dependent Feature |
|---|---|
| Color Space | Bits Per Component |
|  | Transparency |
|  | Resolution |
| Raster Image Type | Transparency |
| Font | Boldness |
|  | Italicizations |
|  | Angle |
|  | Resolution |

510

| Angle Values |
|---|
| All |
| 0 |
| 30 |
| 45 |
| 90 |
| 120 |
| 180 |
| 250 |
| 270 |
| 300 |
| 360 |
| ... etc |

520

| Bits Per Component (BPC) |
|---|
| All |
| 1 |
| 2 |
| 4 |
| 8 |
| 16 |
| 24 |
| 32 |
| ... etc |

530

| Transparency |
|---|
| All |
| 0 |
| 25 |
| 50 |
| 75 |
| 100 |
| ... etc |

540

| Resolution |
|---|
| All |
| 300 |
| 600 |
| Fast1200 |
| Fine1200 |
| ... etc |

TransformationFeature:Value1,Value2,...ValueN:DependentTransformationFeature1(Value11,Value12,...Value1X):DependentTransformationFeature2(Value21,Value22,...Value2Y)...:DependentTransformationFeatureN(ValueN1,ValueN2,...ValueNZ)

720

ImageColorSpace:CalGray,CalRGB,LAB:BitsPerComponent(1,2,3,8,16):Transparency(25,75)

```
<PDLTransform>
        <TransformationFeature Name: ImageColorSpace>
                <Value>CalGray<Value/>
                <Value>CalRGB<Value/>
                <Value>LAB<Value/>
                <DependentTransformationFeature Name: BitsPerComponent>
                        <Value>1<Value/>
                        <Value>2<Value/>
                        <Value>3<Value/>
                        <Value>8<Value/>
                        <Value>16<Value/>
                <DependentTransformationFeature/>
                <DependantTransformationFeature Name: Transparency>
                        <Value>25<Value/>
                        <Value>75<Value/>
                <DependentTransformationFeature/>
        <TransformationFeature/>
<PDLTransform/>
```

@PJL SET PDL_TRANSFORM=OFF/ON

@PJL SET PDL_TRANSFORM_FEATURE=TransformationFeature:Value1,Value2,...ValueN:DependentTransformationFeature1(Value11,Value12,...Value1X):DependentTransformationFeature2(Value21,Value22,...Value2Y)...:DependentTransformationFeatureN(ValueN1,ValueN2,...ValueNZ)

@PJL SET PDL_TRANSFORM_FILE_DESTINATION=USB

TRFM *transform_setting;* where *transform_setting* can be 0 for off or 1 for on

TRLT *transform_list;* where *transform_list* is in the format of:
TransformationFeature:Value1,Value2,...ValueN:DependentTransformationFeature(Value11,Value12,...Value1X): Feature (Value21,Value22,...Value2Y)...:Feature(ValueN1,ValueN2,...ValueNZ)

```
<psf:Feature name="psk:JobPDLTransform">
        <psf:Property name="psf:SeectionType">
                <psf:Value xsi:type="xs:string">psk:PickOne</psf:Value>
        </psf:Property>
                <psf:Option name="psk:Off">  *This specifies PDL transform feature is off
                <psf:Option name="psk:On">  *This specifies PDL transform feature is on <psf:Feature name="psk:JobPDLTransformFeature">
        <psf:Property name="psf:String">
                <psf:Value xsi:type="xs:string">FeatureList</psf:Value>
        </psf:Property>
</psf:Feature>
``` where the FeatureList is in the format of:
TransforamtionFeature:Value1,Value2,...ValueN:DependentTransformation:Feature(Value11,Value12,...Value1X): Feature (Value21,Value22,...Value2Y)...:Feature(ValueN1,ValueN2,...ValueNZ)

```
/* List of values or settings for a transformation feature. */
typedef struct _values
{
   char value_name[128];
   struct _values * _previous;
   struct _values * _next;
} VALUES_LIST;

/* Identifies a feature that is transformable */
{
   char feature_name[128];
   VALUES_LIST * values_list;
} FEATURES;

/* The list of transformation features to be transformed. */
typedef struct _main_features
{
   FEATURE * main_feature;
   DEPENDENCY_FEATURES_LIST * dependency_feature;
   struct _main_features * previous;
   struct _main_features * next;
} MAIN_FEATURES_LIST;
```

```
/* List of dependency features. */
typedef struct _dependency_feature
{
   FEATURE * dependency_feature;
   struct _dependency_feature * previous;
   struct _dependency_feature * next;
} DEPENDENCY_FEATURES_LIST
```

FIG. 9B

METHOD OF GENERATING TRANSFORMED PRINT JOBS

BACKGROUND OF THE INVENTION

A print job may include one or more source files and data to be processed by a printer. A page description language ("PDL") enabled print job may include PDL commands and data that specify various aspects of the print job. A PDL is an abstraction language used to communicate the layout and content of a print job to a printer so that the printer can convert the print job to its native image format and maintain the consistency and appearance of the source. As such, a PDL print job may be viewed as an intermediate file format between a software application's native file format and the PDL-enabled printer's native image format used by the printer to print the print job. For example, when a document is ready for printing, a printer driver or software application may generate a PDL print job that describes the layout and content of the document to be printed in the abstracted PDL. The PDL-enabled printer receives the PDL print job, translates it into a series of rasters, and prints the print job onto a printed page as a single native image such as, for example, a bitmap. Because of the abstraction provided by the PDL, a print job of any complexity may be printed in a uniform manner with little to no variation in printing from printer to printer or from manufacturer to manufacturer, so long as they support the PDL used. Commercially available PDLs include HP® PCL, Adobe® Postscript, Microsoft® eXtensible Markup Language ("XML") Paper Specification ("XPS"), Kyocera® Prescribe, and Kyocera® KPDL. A challenge in developing new printers, their embedded firmware, and printer drivers is validating functionality and compatibility with one or more PDLs.

BRIEF SUMMARY OF THE INVENTION

According to one aspect of one or more embodiments of the present invention, a method of generating transformed print jobs includes inputting a page description language print job and receiving a selection of one or more transformation features and one or more transformation feature settings for each selected transformation feature. For each transformation feature selected, all dependent transformation features are identified. For each dependent transformation feature identified, all dependent feature settings are identified. All combinations of transformation features, transformation feature settings, dependent transformation features, and dependent feature settings are determined. For each combination, the inputted print job is transformed according to the transformation features, transformation feature settings, dependent transformation features, and dependent feature settings of the combination and a transformed print job is outputted.

According to one aspect of one or more embodiments of the present invention, a method of generating transformed print jobs includes inputting a page description language print job and identifying all transformation features. For each transformation feature identified, all transformation feature settings and all dependent features are identified. For each dependent feature identified, all dependent feature settings are identified. All combinations of transformation features, transformation feature settings, dependent features, and dependent feature settings are determined. For each combination, the inputted print job is transformed according to the transformation features, transformation feature settings, dependent transformation features, and dependent feature settings of the combination and a transformed print job is outputted.

According to one or more embodiments of the present invention, a multi-function printer includes a printing engine, a human-computer interface, one or more printed circuit boards, system memory disposed on one or more of the one or more printed circuit boards, one or more processors disposed on one or more of the one or more printed circuit boards, and a raster image processor firmware disposed on one or more of the one or more printed circuit boards. The raster image processor firmware includes an embedded transform component and a PDL interpreter. The embedded transform component and the PDL interpreter are configured to receive PDL transform parameters and transform an inputted print job into one or more transformed print jobs according to the PDL transform parameters.

Other aspects of the present invention will be apparent from the following description and claims.

BRIEF DESCRIPTION OF THE DRAWINGS

FIG. 5 shows an example of dependent transformation features and dependent feature settings in accordance with one or more embodiments of the present invention.

FIGS. 7A and 7B show syntax examples for specifying PDL transform parameters in a string format and in an XML format respectively in accordance with one or more embodiments of the present invention.

FIGS. 8A, 8B, and 8C show command examples for enabling or disabling transformation and passing the PDL transform parameters in Print Job Language ("PJL"), Kyocera® Prescribe, and Microsoft® XPS PDLs respectively in accordance with one or more embodiments of the present invention.

FIGS. 9A, 9B, and 9C show an example data structure for transformation features, an example data structure for dependent transformation features, and a graphical representation of the data structures respectively in accordance with one or more embodiments of the present invention.

DETAILED DESCRIPTION OF THE INVENTION

Figure 1:
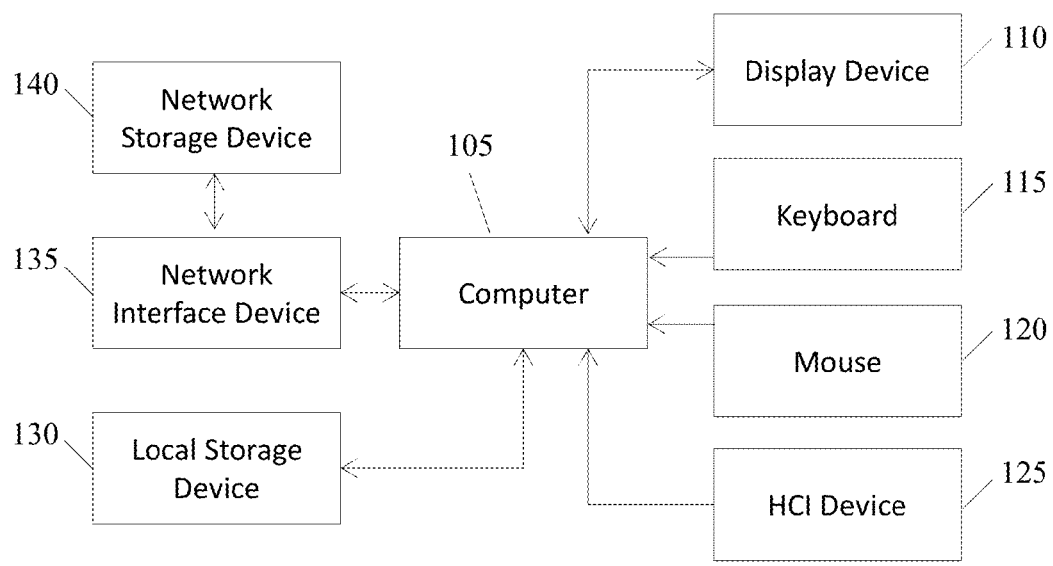
FIG. 1 shows a computing system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a detailed understanding of the present invention. In other instances, well-known features to one of ordinary skill in the art are not described to avoid obscuring the description of the present invention.

The development of multi-function printers, their embedded firmware, and printer drivers requires exhaustive evaluation and testing to ensure that the products will function as intended in the field and to mitigate the risk of undiscovered hardware, firmware, or software bugs. Conventionally, product testing is performed manually by test engineers who execute complex and time-consuming test procedures that are intended to validate the functionality of the products. However, due to the complexity of the products individually, interactions between hardware, firmware, and software, and the large number of possible configurations and settings, it is extremely difficult to fully validate the functionality and compatibility of the products manually. As a consequence, there is typically exposure for untested configurations and settings which often give rise to undiscovered hardware, firmware, or software bugs in the field. Moreover, once the products are released, there may be firmware and printer driver updates that also require evaluation and testing prior to deployment. Because the manual test procedures are so complex and time-consuming, it can delay the introduction of updated firmware and printer drivers that are needed in the field. Further, these updates may include new functionality that was not previously tested or for which there are no established test procedures.

Accordingly, in one or more embodiments of the present invention, a method of generating transformed print jobs transforms a print job into a plurality of variations of the same print job with transformed features and settings. Transformation means varying one or more features or settings of the inputted print job to create a new transformed print job. Specifically, the method generates a plurality of transformed print jobs from an inputted print job by varying the inputted print job according to a combination of transformation features, transformation feature settings, dependent transformation features, and dependent feature settings, where a transformed print job may be generated for each combination. Advantageously, the method provides for the comprehensive testing of a multi-function printer, firmware, or printer driver by generating transformed print jobs that represent all combinations, or a user selected subset, of features and settings.

FIG. 1 shows a computing system 100 in accordance with one or more embodiments of the present invention. Computing system 100 may include one or more computers 105 that each includes one or more printed circuit boards (not shown) on which one or more processors (not shown) and system memory (not shown) may be disposed. Each of the one or more processors may be a single-core processor or a multi-core processor. Multi-core processors typically include a plurality of processor cores (not shown) disposed on the same physical die (not shown) or a plurality of processor cores disposed on multiple die (not shown) that are disposed within the same mechanical package (not shown). Each of the one or more processors may be single or multi-threaded and are capable of executing software instructions in a single thread or in multiple threads. Computing system 100 may include one or more input/output devices such as, for example, a display device 110, keyboard 115, mouse 120, and/or any other human-computer interface device 125. The one or more input/output devices may be discrete or integrated into computer 105. Display device 110 may be a touch screen that includes a touch sensor (not shown) configured to sense touch.

Computing system 100 may include one or more local storage devices 130. Local storage device 130 may be a solid-state memory device, a solid-state memory device array, a hard disk drive, a hard disk drive array, or any other non-transitory computer readable medium. Local storage device 130 may be integrated into computer 105 or removably attached, such as a Universal Serial Bus ("USB") removable storage device. Computing system 100 may include one or more network interface devices 135 that provide a network interface to computer 105. The network interface may be Ethernet, Wi-Fi, Bluetooth, WiMAX, Fibre Channel, or any other network interface suitable to facilitate networked communications. Computing system 100 may include one or more network-attached storage devices 140 in addition to, or instead of, one or more local storage devices 130. Network-attached storage device 140 may be a solid-state memory device, a solid-state memory device array, a hard disk drive, a hard disk drive array, or any other non-transitory computer readable medium. Network-attached storage device 140 may or may not be co-located with computer 105 and may be accessible to computer 105 via one or more network interfaces provided by one or more network interface devices 135. One of ordinary skill in the art will recognize that computer 105 may be a server, a workstation, a desktop, a laptop, a netbook, a tablet, a smartphone, a mobile device, a printer, and/or any other type of computing system in accordance with one or more embodiments of the present invention.

Figure 2:
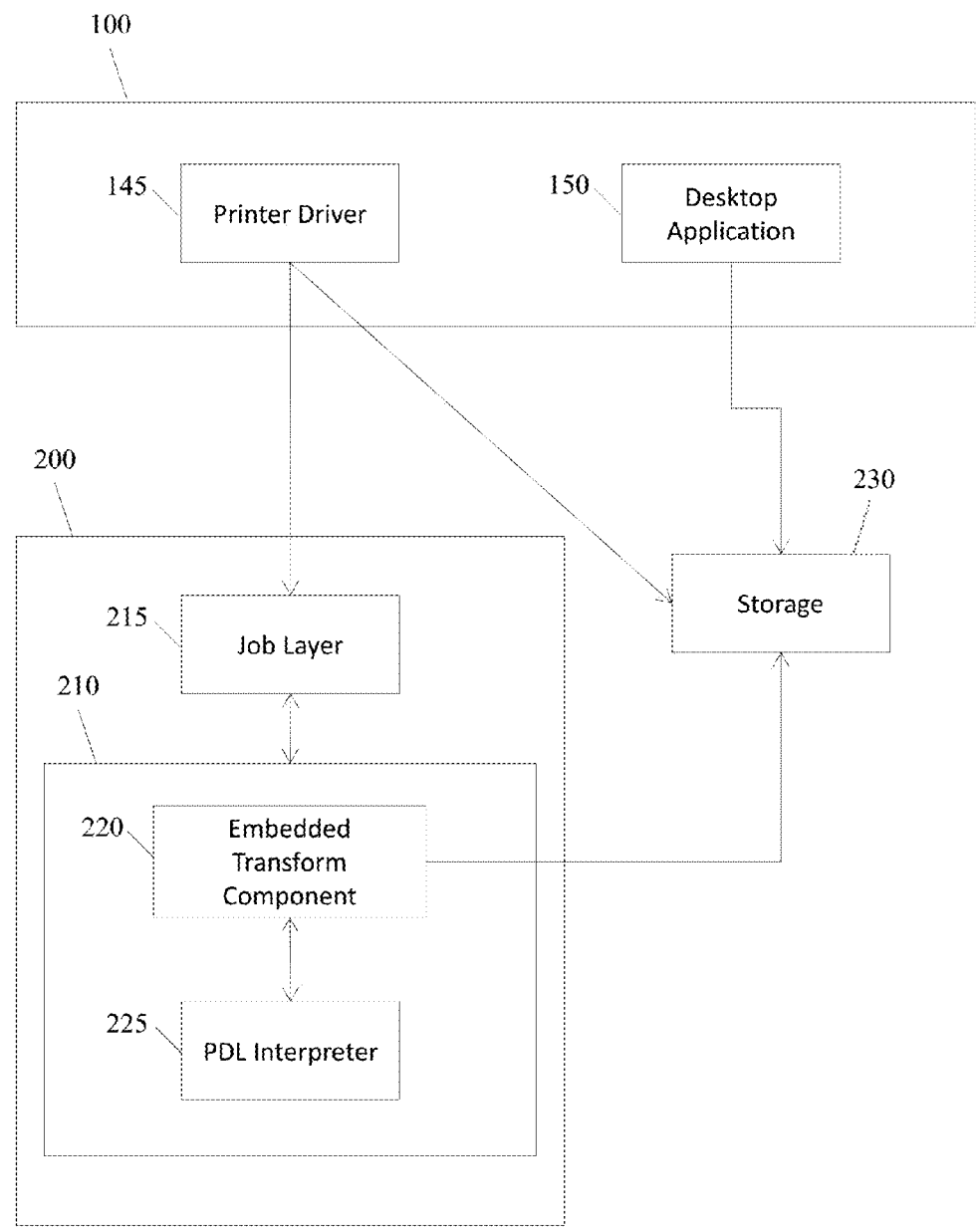
FIG. 2 shows a software interface of a computing system and a multi-function printer in accordance with one or more embodiments of the present invention.

FIG. 2 shows a software interface of a computing system 100 and a multi-function printer 200 in accordance with one or more embodiments of the present invention. A multi-function printer 200 may be a printer that includes additional functionality such as, for example, copying, scanning, or faxing capabilities. While the disclosure that follows references multi-function printers, one of ordinary skill in the art will recognize that a method of generating transformed print jobs may also be used with traditional single function printers in accordance with one or more embodiments of the present invention.

Multi-function printer 200 may include a printing engine (not shown), human-computer interface (not shown) such as, for example, a display device (not shown), a touch screen (not shown), or a control interface (not shown) that may be used to interface with the multi-function printer 200. Multi-function printer 200 may include one or more printed circuit boards (not shown) on which one or more processors (not shown) and system memory (not shown) may be disposed. Multi-function printer 200 may include a raster image processor ("RIP") firmware 210 that produces a raster image, such as, for example, a bitmap, which may be used to print the printed output. In one or more embodiments of the present invention, RIP firmware 210 may include an embedded transform component 220 and a PDL interpreter 225. The RIP firmware 210 may be used to perform a part, or all, of a method of generating transformed print jobs on the multi-function printer 200 in accordance with one or more embodiments of the present invention. In operation, a method of generating transformed print jobs may be performed via a printer driver 145, a stand-alone desktop application 150, a RIP firmware 210, with embedded transform component 220, of multi-function printer 200, or combinations thereof in accordance with one or more embodiments of the present invention.

Computing system 100 may include a printer driver 145 that is configured to perform a part, or all, of a method of generating transformed print jobs in accordance with one or more embodiments of the present invention. Printer driver 145 may be a software driver installed on the operating system (not shown) of computing system 100 that serves as the software interface between the operating system/other software applications (not shown) and multi-function printer 200. In one or more embodiments of the present invention, printer driver 145 may be configured to perform a method of generating transformed print jobs. In such printer driver 145 embodiments, a user may print a document through the operating system/other software application and select through a user interface (not shown) of printer driver 145 to enable transformation and optionally select the transformation features and settings (not shown) to be used.

In certain embodiments, printer driver 145 may generate the transformed print jobs (not shown) from the inputted print job (not shown) directly in printer driver 145 and store the transformed print jobs directly on storage 230. Storage 230 may be a local storage device (not independently illustrated), a removable storage device (not independently illustrated), such as, for example, a USB storage device (not independently illustrated), a network-attached storage device (not independently illustrated), or any other non-transitory computer readable medium (not independently illustrated) configured to store and retrieve data. Storage 230 may or may not be the same as local storage device 130 or network storage device 140 of computing system 100.

In other embodiments, printer driver 145 may communicate the inputted print job to multi-function printer 200 via a cable or wireless interface (not shown) with PDL transform parameters specifying the transformation to be performed by the RIP firmware 210, with embedded transform component 220, of multi-function printer 200. The PDL transform parameters may be provided in a configuration data file or as parameters to the print job. Multi-function printer 200 passes the print job to job layer 215, which processes incoming print jobs. Job layer 215 transfers the print job to the RIP firmware 210. RIP firmware 210 includes embedded transform component 220 and PDL interpreter 225 that interpret the PDL transform parameters provided by printer driver 145 to generate the transformed print jobs. The print job and the transformed print jobs may then be printed or stored in storage 230 for later printing or evaluation.

Computing system 100 may include a stand-alone desktop application 150 that is configured to perform a method of generating transformed print jobs in accordance with one or more embodiments of the present invention. Desktop application 150 may be a discrete software application installed on computing system 100. In desktop application 150 embodiments, a user may, through a user interface of the application 150, specify the print job to be inputted and optionally select the transformation features (not shown) and transformation feature settings (not shown) to be used. In certain embodiments, desktop application 150 may generate the transformed print jobs (not shown) from the inputted print job (not shown) directly in the desktop application 150 and store the transformed print jobs on storage 230 for later printing or evaluation.

RIP firmware 210, with embedded transform component 220, may be configured to perform a part, or all, of a method of generating transformed print jobs from directly inputted data in accordance with one or more embodiments of the present invention. In embodiments where RIP firmware 210 performs all of the method, data may be inputted directly to multi-function printer 200 via storage 230 or other non-transitory computer readable medium. The inputted data may include a print job to be transformed as well as configuration data, such as PDL transform parameters, that specify the transformation to be performed by the embedded transform component 220 of RIP firmware 210 of multi-function printer 200. The PDL transform parameters may be provided in a configuration data file or as parameters to the print job. Multi-function printer 200 passes the print job to the job layer 215 which processes incoming print jobs. Job layer 215 transfers the print job to the RIP firmware 210. RIP firmware 210 includes embedded transform component 220 and PDL interpreter 225 that interpret the PDL transform parameters provided by the inputted data to generate the transformed print jobs. The outputted print job and the outputted transformed print jobs may then be printed or stored in storage 230 for later printing or evaluation.

An inputted PDL print job may include one or more source files and data, including PDL commands and data, in a supported format including, but not limited to, HP® PCL5, HP® PCL6, HP® PCLXL, Adobe® PDF, Adobe® Postscript, Microsoft® XPS, OpenXPS, Apple® Uniform Resource Framework ("URF"), Kyocera® Prescribe, Kyocera® KPDL, document file formats including Microsoft® Word, Microsoft® Excel, Hyper Text Markup Language ("HTML"), and plain text ("TXT"), image file formats, and any other source format capable of being processed by a printer driver (145 of FIG. 2) or printer (200 of FIG. 2). One of ordinary skill in the art will recognize that any supported file format suitable for inputting the PDL print job, including those later developed, may be used in accordance with one or more embodiments of the present invention.

When an outputted transformed print job is saved to storage 230 for later printing or evaluation, the output may be in any supported format, including, but not limited to, HP® PCL5, HP® PCL6, HP® PCLXL, Adobe® PDF, Adobe® Postscript, Microsoft® XPS, OpenXPS, Apple® URF, Kyocera® Prescribe, Kyocera® KPDL, Personalized Print Markup Language ("PPML"), image file formats, and any other supported output format. One of ordinary skill in the art will recognize that any supported file format suitable for outputting the transformed print job, including those later developed, may be used in accordance with one or more embodiments of the present invention.

Figure 3:
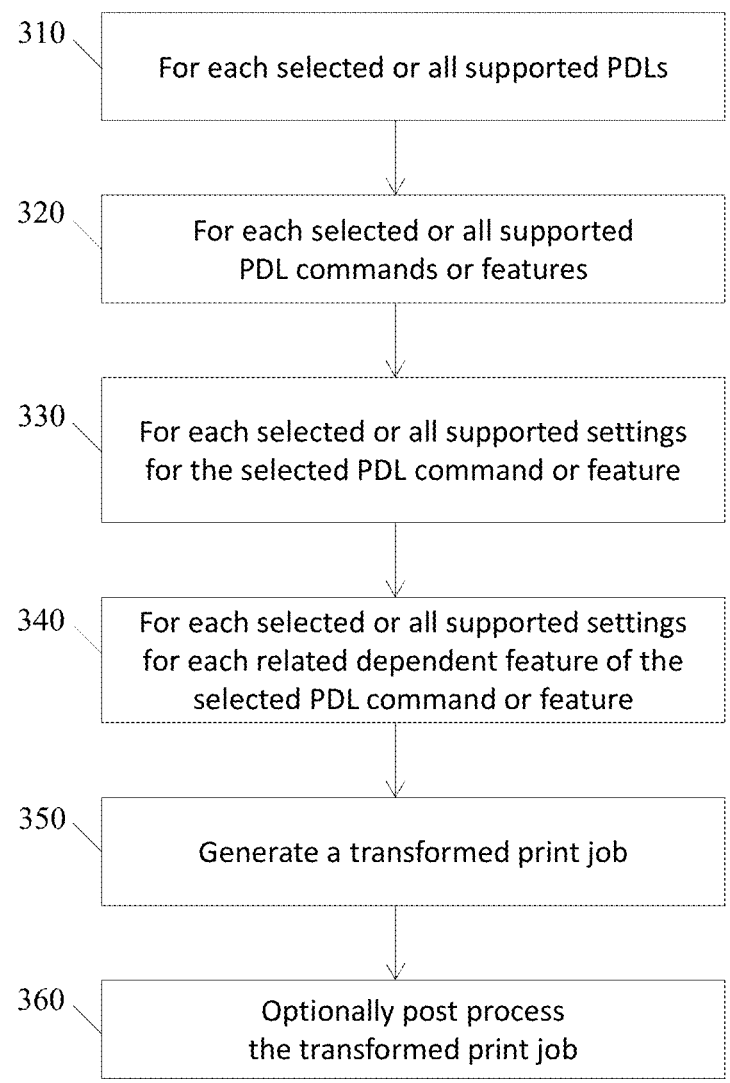
FIG. 3 shows example pseudocode of a method of generating transformed print jobs in accordance with one or more embodiments of the present invention.

FIG. 3 shows example pseudocode 300 of an automated method of generating transformed print jobs in accordance with one or more embodiments of the present invention. Pseudocode 300 represents a generalized algorithm for an automated method of generating transformed print jobs using nested loops. In step 310, a first loop may optionally be created for each selected or all supported PDLs. One or more different PDLs may be selected or supported such that a method of generating transformed print jobs may prepare output appropriate for more than one PDL. In step 320, a second loop may be created for each selected or all supported PDL commands or transformation features. Depending on the embodiment, one or more PDL commands or transformation features may be selected or all supported PDL commands or transformation features may be used.

In step 330, a third loop may be created for each selected or all supported transformation settings for the selected or supported PDL command or transformation feature. In step 340, a fourth loop may be created for each selected or all supported dependent feature settings for each dependent transformation feature of the selected or supported PDL command or transformation feature. In step 350, within these nested loops, a transformed print job may be generated according to the optionally selected PDL, one or more PDL command or transformation features, one or more PDL command or transformation feature settings, one or more dependent transformation features, and one or more dependent feature settings for each dependent transformation feature.

In step 360, the transformed print job may optionally be post processed. Because it is desirable for a method of generating transformed print jobs is to comprehensively test all features and settings, the appearance of a transformed print job may not be of primary importance in some instances. In fact, some combinations of features and settings may result in transformed print jobs that are incorrectly positioned, scaled, or aesthetically unpleasing to the eye. As such, an optional post processing step may be performed that improves the visual appearance of the transformed print job for evaluation. Post processing may include, but is not limited to data truncation, data expansion, dimension resizing, or repositioning adjustments visually necessary because of the transformation. For example, for color spaces, neutral color space values and color space data, such as International Color Consortium ("ICC") color space profile data, may be used to replace and transform the specified color space in the original print job. For raster images, neutral and similar image files may be used with the only difference being the raster image type. For font types, fonts may be selected to ensure that font sizes, scaling, and spacing are adjusted to be almost the same, or as close as possible to, the same as the fonts in the original print job so as to maintain readability of the transformed print job. One of ordinary skill in the art will recognize that other post-processing techniques may be used in accordance with one or more embodiments of the present invention. Additionally, one of ordinary skill in the art will recognize that pseudocode 300 is merely illustrative of the generalized algorithm for generating transformed print jobs and may vary in accordance with one or more embodiments of the present invention.

In certain embodiments, a method of generating transformed print jobs may include inputting a page description language print job and receiving a selection of one or more transformation features and one or more transformation feature settings for each selected transformation feature. For each transformation feature selected, all dependent transformation features are identified. For each dependent transformation feature identified, all dependent feature settings are identified. All combinations of transformation features, transformation feature settings, dependent transformation features, and dependent feature settings are determined. For each combination, the inputted print job is transformed according to the transformation feature, transformation feature setting, one or more dependent transformation features, and one or more dependent feature settings of the combination and a transformed print job is outputted. In other embodiments, a non-transitory computer readable medium may comprise software instructions that, when executed by a processor, perform the above-noted method of generating transformed print jobs.

As noted above, in one or more embodiments of the present invention, all steps of the above-noted method may be performed by a printer driver (145 of FIG. 2), a desktop application (150 of FIG. 2), or RIP firmware (210 of FIG. 2), with embedded transform component (220 of FIG. 2). In other embodiments, a printer driver (145 of FIG. 2) and a RIP firmware (210 of FIG. 2), with embedded transform component (220 of FIG. 2), may cooperatively perform all of the steps of the above-noted method. For example, RIP firmware (210 of FIG. 2), with embedded transform component (220 of FIG. 2), may perform the transforming step, while printer driver (145 of FIG. 2) may perform the other steps of the method.

In still other embodiments, a method of generating transformed print jobs may include inputting a page description language print job and identifying all transformation features. For each transformation feature identified, all transformation feature settings and all dependent features are identified. For each dependent feature identified, all dependent feature settings are identified. All combinations of transformation features, transformation feature settings, dependent features, and dependent feature settings are determined. For each combination, the inputted print job is transformed according to the transformation feature, transformation feature setting, one or more dependent transformation features, and one or more dependent feature settings of the combination and a transformed print job is outputted. In still other embodiments, a non-transitory computer readable medium may comprise software instructions that, when executed by a processor, perform the above-noted method of generating transformed print jobs.

As noted above, in one or more embodiments of the present invention, all steps of the above-noted method may be performed by a printer driver (145 of FIG. 2), a desktop application (150 of FIG. 2), or RIP firmware (210 of FIG. 2), with embedded transform component (220 of FIG. 2). In other embodiments, a printer driver (145 of FIG. 2) and a RIP firmware (210 of FIG. 2), with embedded transform component (220 of FIG. 2), may cooperatively perform all of the steps of the above-noted method. For example, RIP firmware (210 of FIG. 2), with embedded transform component (220 of FIG. 2), may perform the transforming step, while printer driver (145 of FIG. 2) may perform the other steps of the method.

Figure 4:
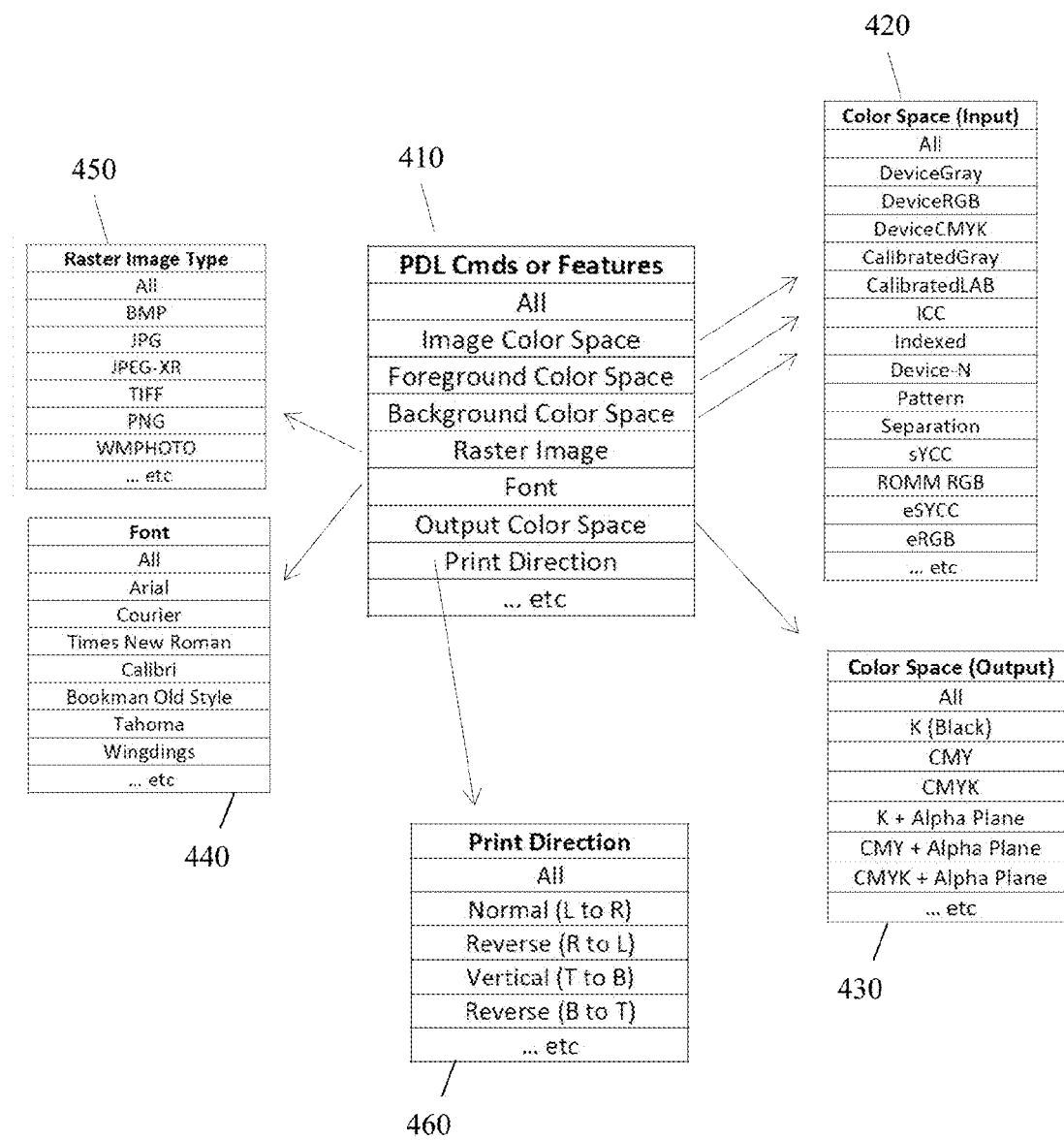
FIG. 4 shows an example of transformation features and transformation feature settings in accordance with one or more embodiments of the present invention.

FIG. 4 shows an example of transformation features (e.g., table 410) and transformation feature settings (e.g., tables 420, 430, 440, 450, and 460) in accordance with one or more embodiments of the present invention. Table 410 shows a non-exhaustive list of PDL commands or transformation features, which may collectively be referred to herein as transformation features, that may be used to generate transformed print jobs. The transformation features may include, but are not limited to, all, image color space, foreground color space, background color space, raster image, font, output color space, print direction, and other commands or transformation features not specifically enumerated herein. One of ordinary skill in the art will recognize that the above-noted transformation features are PDL specifiable features that may be transformed in accordance with one or more embodiments of the present invention. Additionally, one of ordinary skill in the art will recognize that other commands or transformation features, including new commands or transformation features that may be added at a later time, may be supported in accordance with one or more embodiments of the present invention. As shown in FIG. 4, each transformation feature includes a corresponding list of options referred to herein as transformation feature settings. For example, the image color space transformation feature includes a list of options for the transformation feature settings that allows the image color space of the inputted print job to be transformed to another image color space in a transformed print job.

Table 420 shows a non-exhaustive list of transformation feature settings for the image color space, foreground color space, and background color space transformation features. The input color space transformation feature settings may include all, DeviceGray, DeviceRGB, DeviceCMYK, CalibratedGray, CalibratedLAB, ICC, Indexed, Device-N, Pattern, Separation, sYCC, ROMM RGB, eSYCC, eRGB, and other color spaces not specifically enumerated herein. One of ordinary skill in the art will recognize that the above-noted input color space transformation feature settings are well known color spaces that are PDL specifiable and may be transformed in accordance with one or more embodiments of the present invention. Additionally, one of ordinary skill in the art will recognize that other transformation feature settings, including new feature settings that may be added at a later time, may be supported in in accordance with one or more embodiments of the present invention.

Table 430 shows a non-exhaustive list of transformation feature settings for the output color space transformation feature. The output color space transformation feature settings may include all, K (black), CMY, CMYK, K+Alpha Plane, CMY+Alpha Plane, CMYK+Alpha Plane, and other color spaces not specifically enumerated herein. One of ordinary skill in the art will recognize that the above-noted output color space transformation feature settings are well known color spaces that are PDL specifiable and may be transformed in accordance with one or more embodiments of the present invention. Additionally, one of ordinary skill in the art will recognize that other transformation feature settings, including new feature settings that may be added at a later time, may be supported in accordance with one or more embodiments of the present invention.

Table 440 shows a non-exhaustive list of transformation feature settings for the font transformation feature. The font transformation feature settings may include all, Arial, Courier, Times New Roman, Calibri, Bookman Old Style, Tahoma, Wingdings, and other fonts or font families not specifically enumerated herein. One of ordinary skill in the art will recognize that the above-noted font transformation feature settings are well known font families that are PDL specifiable and may be transformed in accordance with one or more embodiments of the present invention. Additionally, one of ordinary skill in the art will recognize that other transformation feature settings, including new feature settings that may be added at a later time, may be supported in accordance with one or more embodiments of the present invention.

Table 450 shows a non-exhaustive list of transformation feature settings for the raster image type transformation feature. The raster image type transformation feature settings may include all, BMP, JPG, JPG-XR, TIFF, PNG, WMP, and other image formats not specifically enumerated herein. One of ordinary skill in the art will recognize that the above-noted raster image type transformation feature settings are well known image formats that are PDL specifiable and may be transformed in accordance with one or more embodiments of the present invention. Additionally, one of ordinary skill in the art will recognize that other transformation feature settings, including new feature settings that may be added at a later time, may be supported in accordance with one or more embodiments of the present invention.

Table 460 shows a non-exhaustive list of transformation feature settings for the print direction transformation feature. The print direction transformation feature settings may include all, normal (left to right), reverse (right to left), vertical (top to bottom), reverse (bottom to top), and other direction transformations not specifically enumerated herein. One of ordinary skill in the art will recognize that the above-noted print direction transformation feature settings are well known commands that are PDL specifiable and may be transformed in accordance with one or more embodiments of the present invention. Additionally, one of ordinary skill in the art will recognize that other transformation feature settings, including new feature settings that may be added at a later time, may be supported in accordance with one or more embodiments of the present invention.

One of ordinary skill in the art will recognize that the transformation features and transformation feature settings shown in FIG. 4 are merely illustrative and all supported transformation features and transformation feature settings, including those not shown or potentially added at a later time, may be used in accordance with one or more embodiments of the present invention.

FIG. 5 shows an example of dependent transformation features (e.g., table 505) and dependent feature settings (e.g., tables 510, 520, 530, and 540) in accordance with one or more embodiments of the present invention. Certain transformation features may have dependent transformation features that may also require specification if the transformation feature is varied. Dependency relationship table 505 shows example transformation features and their related dependent transformation features. For example, the color space transformation feature may, for example, have at least three dependent transformation features including bits per component, transparency, and resolution. The raster image type transformation feature may, for example, have at least one dependent transformation feature including transparency. The font transformation feature may, for example, have at least four dependent transformation features including boldness, italicizations, angle, and resolution. One of ordinary skill in the art will recognize that each transformation feature may have one or more dependent transformation features, including those that are not specifically enumerated herein, in accordance with one or more embodiments of the present invention.

Table 510 shows a non-exhaustive list of dependent feature settings for the angle dependent transformation feature. The angle dependent feature settings may include all, 0°, 30°, 45°, 90°, 120°, 180°, 250°, 270°, 300°, 360°, and others not specifically enumerated herein. One of ordinary skill in the art will recognize that the above-noted angle dependent feature settings are well known angles that are PDL specifiable and may be transformed in accordance with one or more embodiments of the present invention. Additionally, one of ordinary skill in the art will recognize that other dependent feature settings, including new feature settings that may be added at a later time, may be supported in accordance with one or more embodiments of the present invention.

Table 520 shows a non-exhaustive list of dependent feature settings for the bits per component dependent transformation feature. The bits per component ("BPC") dependent feature settings may include all, 1 BPC, 2 BPC, 4 BPC, 8 BPC, 16 BPC, 24 BPC, 32 BPC, and others not specifically enumerated herein. One of ordinary skill in the art will recognize that the above-noted BPC dependent feature settings are well known indicators of the number of bits used per component that are PDL specifiable and may be transformed in accordance with one or more embodiments of the present invention. Additionally, one of ordinary skill in the art will recognize that other dependent feature settings, including new feature settings that may be added at a later time, may be supported in accordance with one or more embodiments of the present invention.

Table 530 shows a non-exhaustive list of dependent feature settings for the transparency dependent transformation feature. The transparency dependent feature settings may include all, 0%, 25%, 50%, 75%, 100%, and others not specifically enumerated herein. One of ordinary skill in the art will recognize that the above-noted transparency dependent feature settings are well known transparency percentages that are PDL specifiable and may be transformed in accordance with one or more embodiments of the present invention. Additionally, one of ordinary skill in the art will recognize that other dependent feature settings, including new feature settings that may be added at a later time, may be supported in accordance with one or more embodiments of the present invention.

Table 540 shows a non-exhaustive list of dependent feature settings for the resolution dependent transformation feature. The resolution dependent feature settings may include all, 300 dots per inch ("DPI"), 600 DPI, Fast1200 DPI, Fine1200 DPI, and others not specifically enumerated herein. One of ordinary skill in the art will recognize that the above-noted resolution dependent feature settings are well known specifications for resolution that are PDL specifiable and may be transformed in accordance with one or more embodiments of the present invention. Additionally, one of ordinary skill in the art will recognize that other dependent feature settings, including new feature settings that may be added at a later time, may be supported in accordance with one or more embodiments of the present invention.

One of ordinary skill in the art will recognize that the dependent transformation features and dependent feature settings shown in FIG. 5 are merely illustrative and all supported dependent transformation features and dependent feature settings, including those not shown or potentially added at a later time, may be used in accordance with one or more embodiments of the present invention.

Figure 6:
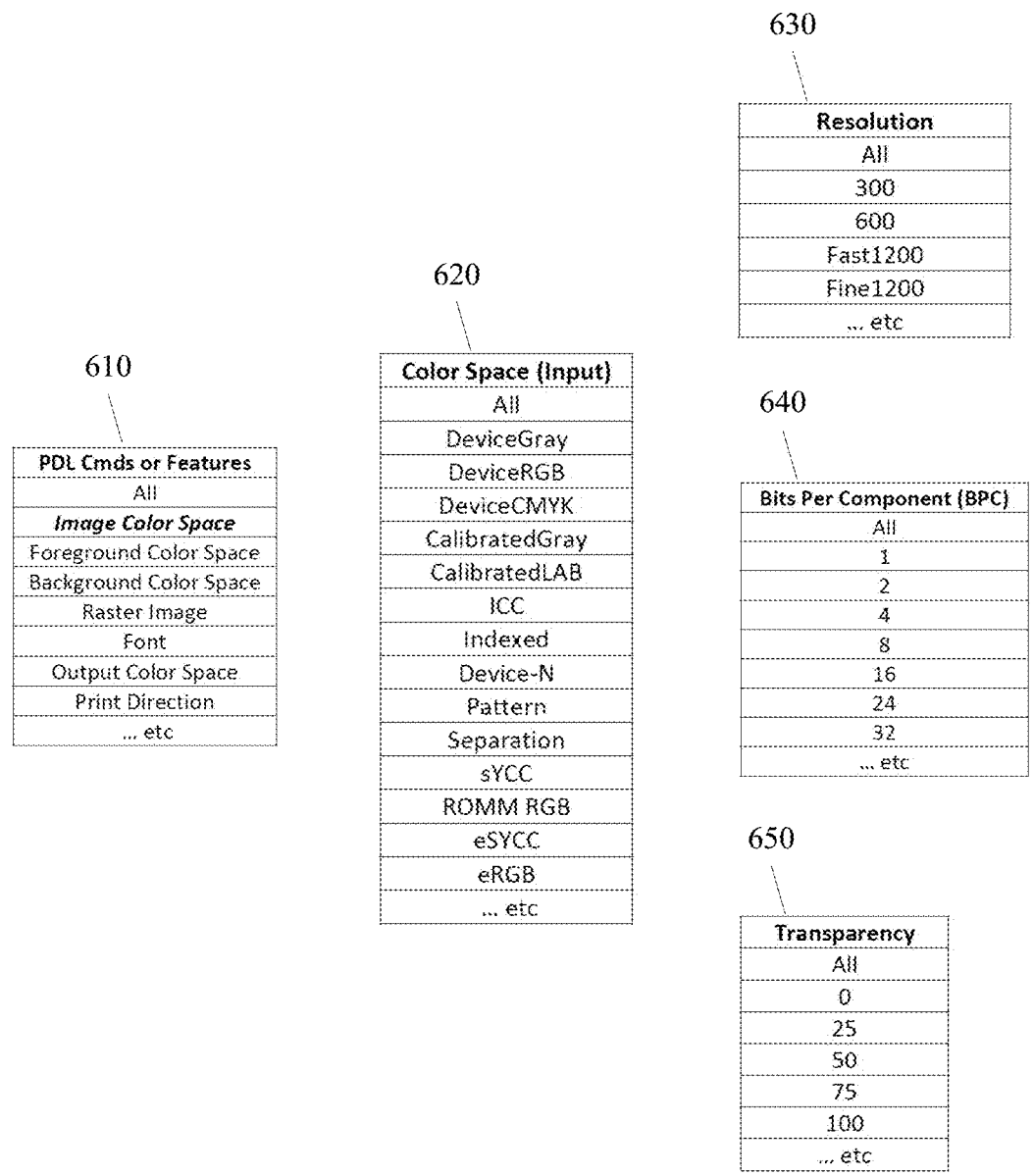
FIG. 6 shows an example of a selected transformation feature, transformation feature settings, dependent transformation features, and dependent feature settings in accordance with one or more embodiments of the present invention.

FIG. 6 shows an example of a selected transformation feature (e.g., image color space of table 610) its transformation feature settings (e.g., table 620), its dependent transformation features (e.g., resolution, BPC, and transparency of tables 630, 640, and 650), and dependent feature settings (e.g., tables 630, 640, and 650) in accordance with one or more embodiments of the present invention. For purposes of illustration only, in table 610, the example selected transformation feature is image color space. Table 620 shows a non-exhaustive list of the transformation feature settings for the color space transformation feature. The color space transformation feature settings may include all, DeviceGray, DeviceRGB, DeviceCMYK, CalibratedGray, CalibratedLAB, ICC, Indexed, Device-N, Pattern, Separation, sYCC, ROMM RGB, eSYCC, eRGB, and others not specifically enumerated herein. The example selected transformation feature has dependent transformation features including resolution, BPC, and transparency.

Table 630 shows a non-exhaustive list of the dependent feature settings for the resolution dependent transformation feature. The resolution dependent feature settings may include all, 300 DPI, 600 DPI, Fast1200 DPI, Fine1200 DPI, and others not specifically enumerated herein. Table 640 shows a non-exhaustive list of the dependent feature settings for the BPC dependent transformation feature. The BPC dependent feature settings may include all, 1 BPC, 2 BPC, 4 BPC, 8 BPC, 16 BPC, 24 BPC, 32 BPC, and others not specifically enumerated herein. Table 650 shows a non-exhaustive list of dependent feature settings for the transparency dependent transformation feature. The transparency dependent feature settings may include all, 0%, 25%, 50%, 75%, 100%, and others not specifically enumerated herein.

All combinations, or a user selected subset, of transformation features, transformation feature settings, dependent transformation features, and dependent feature settings may be determined and used for transforming the inputted print job into a plurality of transformed print jobs. As an example, one combination of transformation feature, transformation feature setting, dependent transformation features, and dependent feature settings may include image color space, DeviceGray, 300 DPI resolution, 2 BPC, and 25% transparency. Another combination may include image color space, DeviceRGB, 600 DPI resolution, 8 BPC, and 100% transparency. In each case the corresponding features and settings of the inputted print job are replaced by the combination's features and settings to generate its transformed print job. One of ordinary skill in the art will recognize that a method of generating transformed print jobs may generate all combinations, or a user selected subset, of features and settings in accordance with one or more embodiments of the present invention.

FIG. 7A shows syntax examples for specifying PDL transform parameters in a string format in accordance with one or more embodiments of the present invention. The PDL transform parameters are the transformation features, transformation feature settings, dependent transformation features, and dependent feature settings that are to be used to transform the inputted print job into the one or more transformed print jobs. The PDL transform parameters are the specification for performing the transformation and may be used by a printer driver (145 of FIG. 2), a printer driver (145 of FIG. 2) and multi-function printer (200 of FIG. 2), or a stand-alone desktop application (150 of FIG. 2) to generate the transformed print jobs.

The PDL transform parameters may be provided in a configuration data file or as parameters to the print job itself. In certain embodiments, a configuration data file may be created to store the PDL transform parameters and used with a printer driver (145 of FIG. 2) or stand-alone desktop application (150 of FIG. 2). The data from the configuration data file may be read, parsed, and loaded into the computing system's memory and used to generate all selected or supported combinations of features and settings.

In printer driver (145 of FIG. 2) embodiments, the PDL transform parameters may be provided in a configuration data file or generated by the printer driver itself as parameters to the print job. In certain printer driver embodiments, the printer driver may use the PDL transform parameters to generate the transformed print jobs itself. In other printer driver embodiments, the printer driver may pass the PDL transform parameters as parameters to the print job to the multi-function printer (200 of FIG. 2). The multi-function printer processes the PDL transform parameters in the RIP firmware (210 of FIG. 2), with embedded transform component (220 of FIG. 2), to generate the transformed print jobs. In stand-alone desktop application (150 of FIG. 2) embodiments, the PDL transform parameters are provided in a configuration data file or generated through a user interface. The stand-alone desktop application processes the PDL transform parameters and generates the transformed print jobs.

In certain embodiments, a string format may be used to specify the PDL transform parameters. Syntax 710 shows example syntax for a string format that communicates the transformation feature, its transformation feature settings, the dependent transformation features, and the dependent feature settings. String 720 shows an example of a string format in syntax 710 indicating that the transformation feature to be transformed is image color space, that the transformation feature settings are CalibratedGray, CalibratedRGB, and CalibratedLAB, that the dependent transformation features are BPC and transparency, that the BPC dependent feature settings include 1 BPC, 2 BPC, 3 BPC, 8 BPC, and 16 BPC, and that the transparency dependent feature settings include 25% and 75%. One of ordinary skill in the art will recognize that the example syntax provided is merely illustrative and other syntax may be used in accordance with one or more embodiments of the present invention. Alternatively, an XML format may be used to pass the PDL transform parameters to the multi-function printer. In FIG. 7B, XML 730 shows an example of the same PDL transform parameters as that shown in string 720, in XML format. One of ordinary skill in the art will recognize that other formats may be used in accordance with one or more embodiments of the present invention.

FIG. 8A shows command examples for enabling or disabling transformation and passing the PDL transform parameters in a print job header using PJL in accordance with one or more embodiments of the present invention. In certain embodiments, transformation may be enabled or disabled and the PDL transform parameters may be provided as part of the header for the print job such that the transformation may be performed by the RIP firmware (210 of FIG. 2), with embedded transform component (220 of FIG. 2), of the multi-function printer (200 of FIG. 2). In this way, the PDL transformation may be specified as part of the print job itself. Because this is RIP based, this example is not applicable to printer driver (145 of FIG. 2) or stand-alone desktop application (150 of FIG. 2) embodiments. Continuing, FIG. 8B shows command examples for enabling or disabling transformation and passing the PDL transform parameters in a print job header using Kyocera® Prescribe in accordance with one or more embodiments of the present invention. Continuing, FIG. 8C shows command examples for enabling or disabling transformation and passing the PDL transform parameters in a print job header using Microsoft® XPS in accordance with one or more embodiments of the present invention. One of ordinary skill in the art will recognize that different syntax, command examples, as well as other PDLs may be used in a similar manner in accordance with one or more embodiments of the present invention.

Figure 9C:
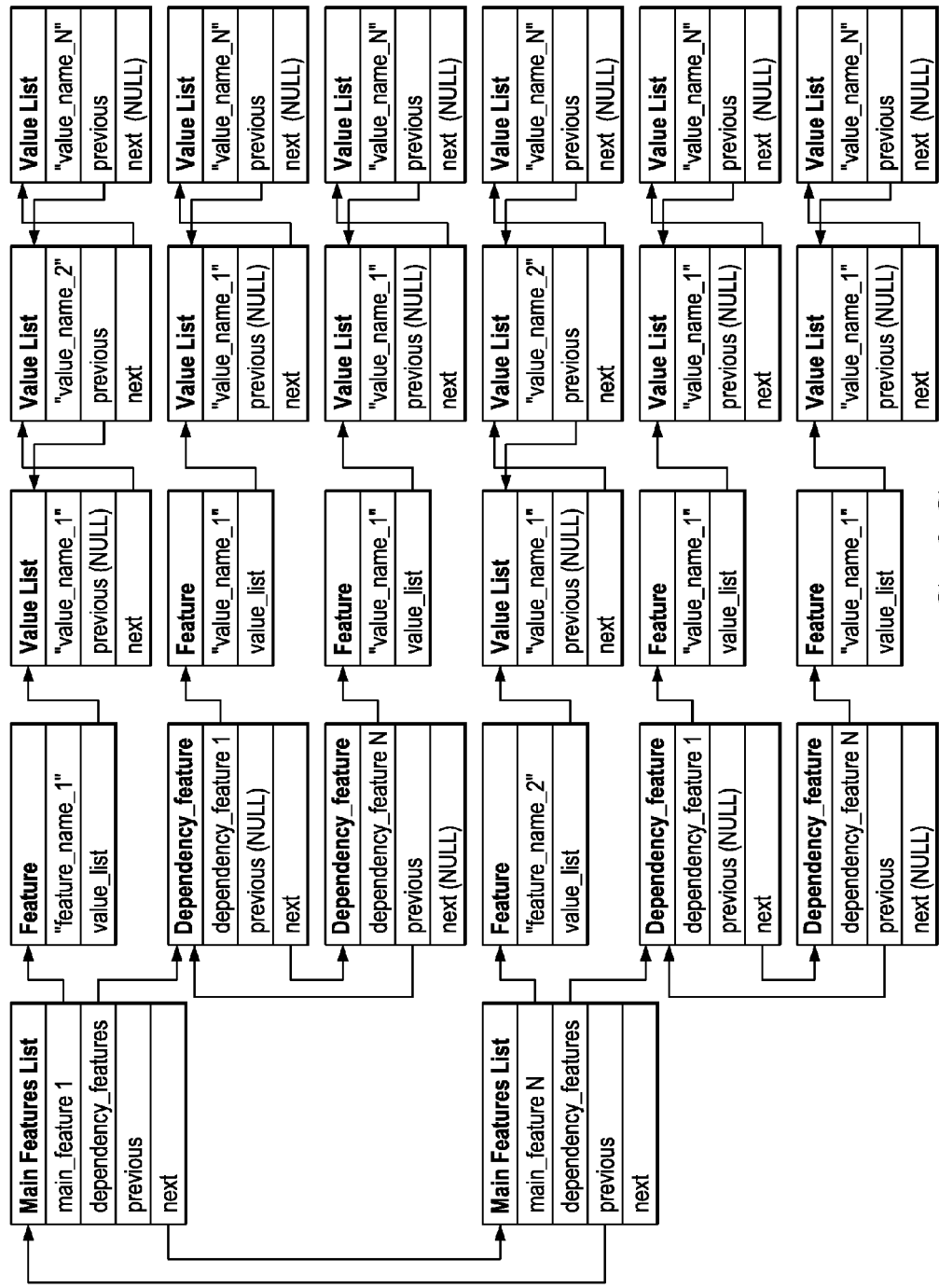

FIG. 9A shows an example data structure 910 for transformation features in accordance with one or more embodiments of the present invention. The data structure 910 for transformation features may be configured to specify all transformation features and all transformation feature settings. Continuing, FIG. 9B shows an example data structure 920 for dependent transformation features in accordance with one or more embodiments of the present invention. The data structure 920 for dependent transformation features may be configured to specify all dependent transformation features and all dependent feature settings. One of ordinary skill in the art will recognize that other data structures may be used in accordance with one or more embodiments of the present invention. Continuing, FIG. 9C shows a graphical representation of the relationship between the data structures for transformation features and dependent transformation features in accordance with one or more embodiments of the present invention.

Figure 10:
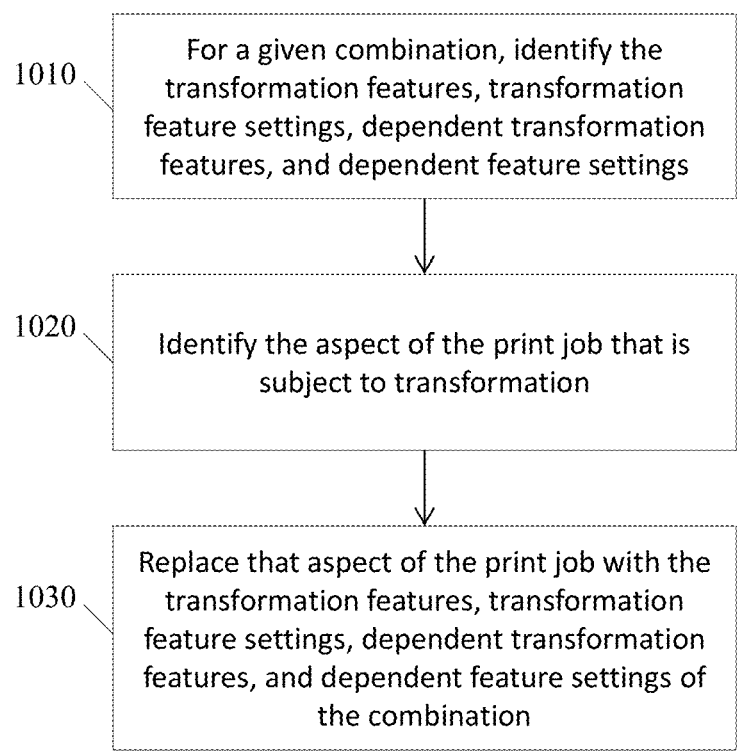
FIG. 10 shows a transformation process of a method of generating transformed print jobs in accordance with one or more embodiments of the present invention.

FIG. 10 shows a transformation process 1000 of a method of generating transformed print jobs in accordance with one or more embodiments of the present invention. The method of generating transformed print jobs may include inputting a PDL print job that includes, for example, a PDF file with an image or other aspect capable of transformation. The inputted PDL print job may, for example, specify an image color space of DeviceGray, 1 BPC, and an output color space of CanK for the image. Upon a directive to generate transformed print jobs, it is these features and settings, and any dependent transformation features and dependent feature settings, which may be varied to generate the transformed print jobs.

Continuing with the example for purposes of illustration only, the transformation feature settings for the image color space transformation feature may include DeviceGray, DeviceRGB, DeviceCMYK, CalGray, CalRGB, LAB, and ICC. The image color space transformation feature may have a dependent transformation feature of bits per component. The dependent feature settings for the bits per component dependent transformation feature may include 1 BPC, 2 BPC, 4 BPC, 8 BPC, and 16 BPC. The transformation feature settings for the output color space transformation feature may include CanK and CanCMY. As such, there is a first transformation feature with 7 different values, a dependent transformation feature with 5 different values, and a second transformation feature with 2 different values for a total of 70 possible combinations of features and settings, which, in this instance, includes the inputted PDL print job.

The following table shows the 70 possible combinations for the example provided above, with the first entry being the specification for the inputted PDL print job and the remaining entries representing specifications for the transformed print jobs.

TABLE 1

| | | |
|---|---|---|
| ImageColorSpace: DeviceGray | BitsPerComponent: 1 | OutputColorSpace: CanK |
| ImageColorSpace: DeviceGray | BitsPerComponent: 1 | OutputColorSpace: CanCMY |
| ImageColorSpace: DeviceGray | BitsPerComponent: 2 | OutputColorSpace: CanK |
| ImageColorSpace: DeviceGray | BitsPerComponent: 2 | OutputColorSpace: CanCMY |
| ImageColorSpace: DeviceGray | BitsPerComponent: 4 | OutputColorSpace: CanK |
| ImageColorSpace: DeviceGray | BitsPerComponent: 4 | OutputColorSpace: CanCMY |
| ImageColorSpace: DeviceGray | BitsPerComponent: 8 | OutputColorSpace: CanK |
| ImageColorSpace: DeviceGray | BitsPerComponent: 8 | OutputColorSpace: CanCMY |
| ImageColorSpace: DeviceGray | BitsPerComponent: 16 | OutputColorSpace: CanK |
| ImageColorSpace: DeviceGray | BitsPerComponent: 16 | OutputColorSpace: CanCMY |
| ImageColorSpace: DeviceRGB | BitsPerComponent: 1 | OutputColorSpace: CanK |
| ImageColorSpace: DeviceRGB | BitsPerComponent: 1 | OutputColorSpace: CanCMY |

TABLE 1-continued

| ImageColorSpace | BitsPerComponent | OutputColorSpace |
|---|---|---|
| DeviceRGB | 2 | CanK |
| DeviceRGB | 2 | CanCMY |
| DeviceRGB | 4 | CanK |
| DeviceRGB | 4 | CanCMY |
| DeviceRGB | 8 | CanK |
| DeviceRGB | 8 | CanCMY |
| DeviceRGB | 16 | CanK |
| DeviceRGB | 16 | CanCMY |
| DeviceCMYK | 1 | CanK |
| DeviceCMYK | 1 | CanCMY |
| DeviceCMYK | 2 | CanK |
| DeviceCMYK | 2 | CanCMY |
| DeviceCMYK | 4 | CanK |
| DeviceCMYK | 4 | CanCMY |
| DeviceCMYK | 8 | CanK |
| DeviceCMYK | 8 | CanCMY |
| DeviceCMYK | 16 | CanK |
| DeviceCMYK | 16 | CanCMY |
| CalGray | 1 | CanK |
| CalGray | 1 | CanCMY |
| CalGray | 2 | CanK |
| CalGray | 2 | CanCMY |
| CalGray | 4 | CanK |
| CalGray | 4 | CanCMY |
| CalGray | 8 | CanK |
| CalGray | 8 | CanCMY |
| CalGray | 16 | CanK |
| CalGray | 16 | CanCMY |
| CalRGB | 1 | CanK |
| CalRGB | 1 | CanCMY |
| CalRGB | 2 | CanK |
| CalRGB | 2 | CanCMY |
| CalRGB | 4 | CanK |
| CalRGB | 4 | CanCMY |
| CalRGB | 8 | CanK |
| CalRGB | 8 | CanCMY |
| CalRGB | 16 | CanK |
| CalRGB | 16 | CanCMY |
| LAB | 1 | CanK |
| LAB | 1 | CanCMY |
| LAB | 2 | CanK |
| LAB | 2 | CanCMY |
| LAB | 4 | CanK |
| LAB | 4 | CanCMY |
| LAB | 8 | CanK |
| LAB | 8 | CanCMY |
| LAB | 16 | CanK |
| LAB | 16 | CanCMY |
| ICC | 1 | CanK |
| ICC | 1 | CanCMY |
| ICC | 2 | CanK |
| ICC | 2 | CanCMY |
| ICC | 4 | CanK |
| ICC | 4 | CanCMY |
| ICC | 8 | CanK |
| ICC | 8 | CanCMY |
| ICC | 16 | CanK |
| ICC | 16 | CanCMY |

Returning to the FIG. 10, in step 1010, for a given combination, the transformation features, transformation feature settings, dependent transformation features, and dependent feature settings are identified. In the example given above, this would correspond to a line entry in Table 1. In step 1020, the image or aspect of the print job that is subject to transformation (not shown) is identified. In step 1030, the image or aspect of the print job is replaced (not shown) with the transformation features, transformation feature settings, dependent transformation features, and dependent feature settings of the combination. As such, excluding the inputted PDL print job, there would be 69 transformed print jobs generated in the above-noted example. One of ordinary skill in the art will recognize that the above-noted example is merely illustrative in accordance with one or more embodiments of the present invention.

Figure 11:
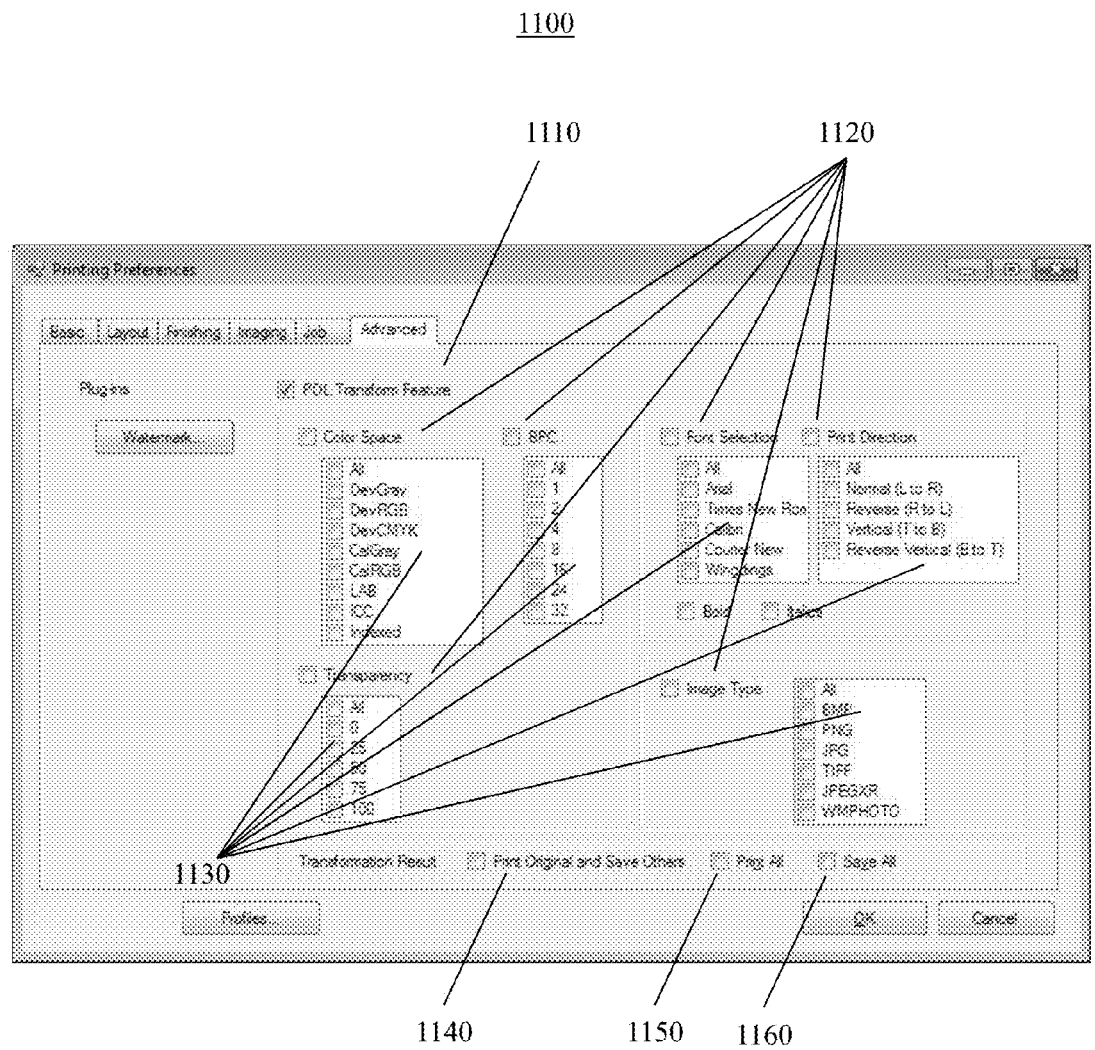
FIG. 11 shows an example printer driver user interface for a method of generating transformed print jobs in accordance with one or more embodiments of the present invention.

FIG. 11 shows an example printer driver (145 of FIG. 2) user interface 1100 for a method of generating transformed print jobs in accordance with one or more embodiments of the present invention. In certain embodiments, when a user prints a document, or print job, through a software application, the user may select the desired printer and select the printer properties for the selected printer to invoke the printer driver (145 of FIG. 2). In the printer driver (145 of FIG. 2) user interface, an advanced tab may be provided that includes a number of options. For example, the advanced tab may include a check box 1110 to enable or disable transformation. When enabled, the user may then select one or more of the transformation features 1120 that the user wishes to test. Under each selected transformation feature 1120, the user may select the transformation feature settings 1130 to be tested. All dependent transformation features and dependent feature settings may be determined based on their dependency to the selected transformation features. The user may also have the option of selecting the type of output. For example, the user may select to print the original print job and save the transformed print jobs generated 1140, print the original print job and all transformed print jobs 1150, or save the original print job and all transformed print jobs to storage 1160. In this way, the printer driver (145 of FIG. 2) tests all combinations, or a user selected subset, of transformation features, transformation feature settings, dependent transformation features, and dependent feature settings.

In other embodiments, when a user prints a document, or print job, through a software application, the user may select the desired printer and select the printer properties for the selected printer to invoke the printer driver (145 of FIG. 2). In the printer driver (145 of FIG. 2) user interface (not shown), an advanced tab may be provided that includes a check box (not shown) to enable transformation. When the PDL transform feature is enabled, the printer driver will use all supported transformation features, all transformation feature settings, all dependent transformation features, and all dependent feature settings to generate the transformed print jobs. The user may also have the option of selecting the type of output. For example, the user may select to print the original print job and save the transformed print jobs generated, print the original print job and all transformed print jobs, or save the original print job and all transformed print jobs to storage. In such an embodiment, the printer driver (145 of FIG. 2) user interface serves as a switch to enable or disable transformation, but once enabled, the printer driver (145 of FIG. 2) tests all combinations of transformation features, transformation feature settings, dependent transformation features, and dependent feature settings.

Figure 12:
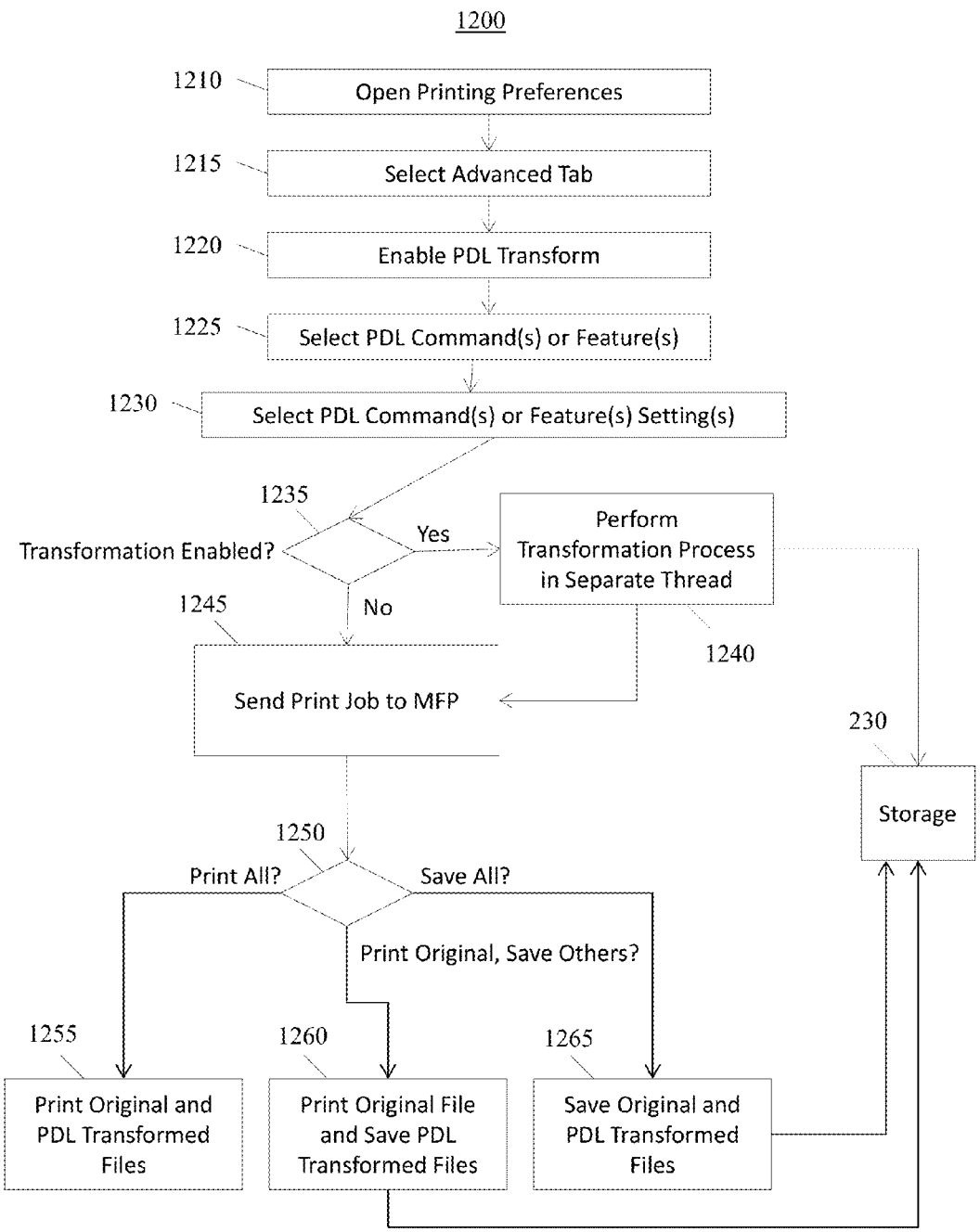
FIG. 12 shows a workflow for a printer driver implemented method of generating transformed print jobs in accordance with one or more embodiments of the present invention.

FIG. 12 shows a workflow 1200 for a printer driver (145 of FIG. 2) implemented method of generating transformed print jobs in accordance with one or more embodiments of the present invention. In step 1210, a user may select a printer and select the printer properties to invoke a printer driver (145 of FIG. 2) user interface (e.g., 1100 of FIG. 11). In step 1215, the user may select the advanced tab where the transformation configuration options may be disposed. In step 1220, the user may enable transformation. In certain embodiments, in step 1225, the user may select the PDL commands or transformation features that the user wishes to test. In other embodiments, the user may select all PDL commands or transformation features. In still other embodiments, so long as the PDL transform feature is enabled, the printer driver (145 of FIG. 2) may automatically select all PDL commands or transformation features.

In certain embodiments, in step 1230, the user may select the PDL command or transformation feature settings to be tested. In other embodiments, the user may select all PDL commands or transformation feature settings. In still other embodiments, so long as the PDL transform feature is enabled, the printer driver (145 of FIG. 2) may automatically select all PDL commands or transformation feature settings. All dependent transformation features and dependent feature settings may be determined based on their dependency to the selected transformation features. The user may proceed to printing by clicking through the printer driver (145 of FIG. 2) user interface. In step 1235, the printer driver (145 of FIG. 2) makes a determination as to whether transformation is enabled. If transformation is not enabled, the process continues to step 1245, where the printer driver (145 of FIG. 2) passes the print job to the multi-function printer.

If transformation is enabled, the printer driver (145 of FIG. 2) performs a method of generating transformed print jobs in a separate thread, or the printer driver (145 of FIG. 2) performs a part of the method in a separate thread and the multi-function printer (200 of FIG. 2) performs another part of the method. For example, in certain embodiments, the printer driver (145 of FIG. 2) may receive a selection of one or more transformation features and one or more transformation feature settings for each selected transformation feature. The printer driver (145 of FIG. 2) may identify all dependent transformation features and all dependent feature settings. The printer driver (145 of FIG. 2) may also determine all combinations of transformation features, transformation feature settings, dependent transformation features, and dependent feature settings. In certain embodiments, the printer driver (145 of FIG. 2) may generate a transformed print job for each combination or, in other embodiments, the printer driver (145 of FIG. 2) may pass PDL transform parameters to the multi-function printer (200 of FIG. 2) specifying the combinations so that the RIP firmware (210 of FIG. 2), with embedded transform component (220 of FIG. 2), can generate a transformed print job for each combination.

In step 1250, the printer driver (145 of FIG. 2) makes a determination as to what type of output the user desires based on the user's selection. If the user wished to print all, in step 1255, the original print job and the transformed print jobs may be printed by the multi-function printer (200 of FIG. 2). If the user wishes to print the original print job and save the rest, in step 1260, the original print job is printed by the multi-function printer (200 of FIG. 2) and the transformed print jobs may be saved, by the printer driver (145 of FIG. 2) or the multi-function printer (200 of FIG. 2), to storage 230. If the user wishes to save all, in step 1265, the original print job and the transformed print jobs may be saved, by the printer driver (145 of FIG. 2) or the multi-function printer (200 of FIG. 2), to storage 230.

Figure 13:
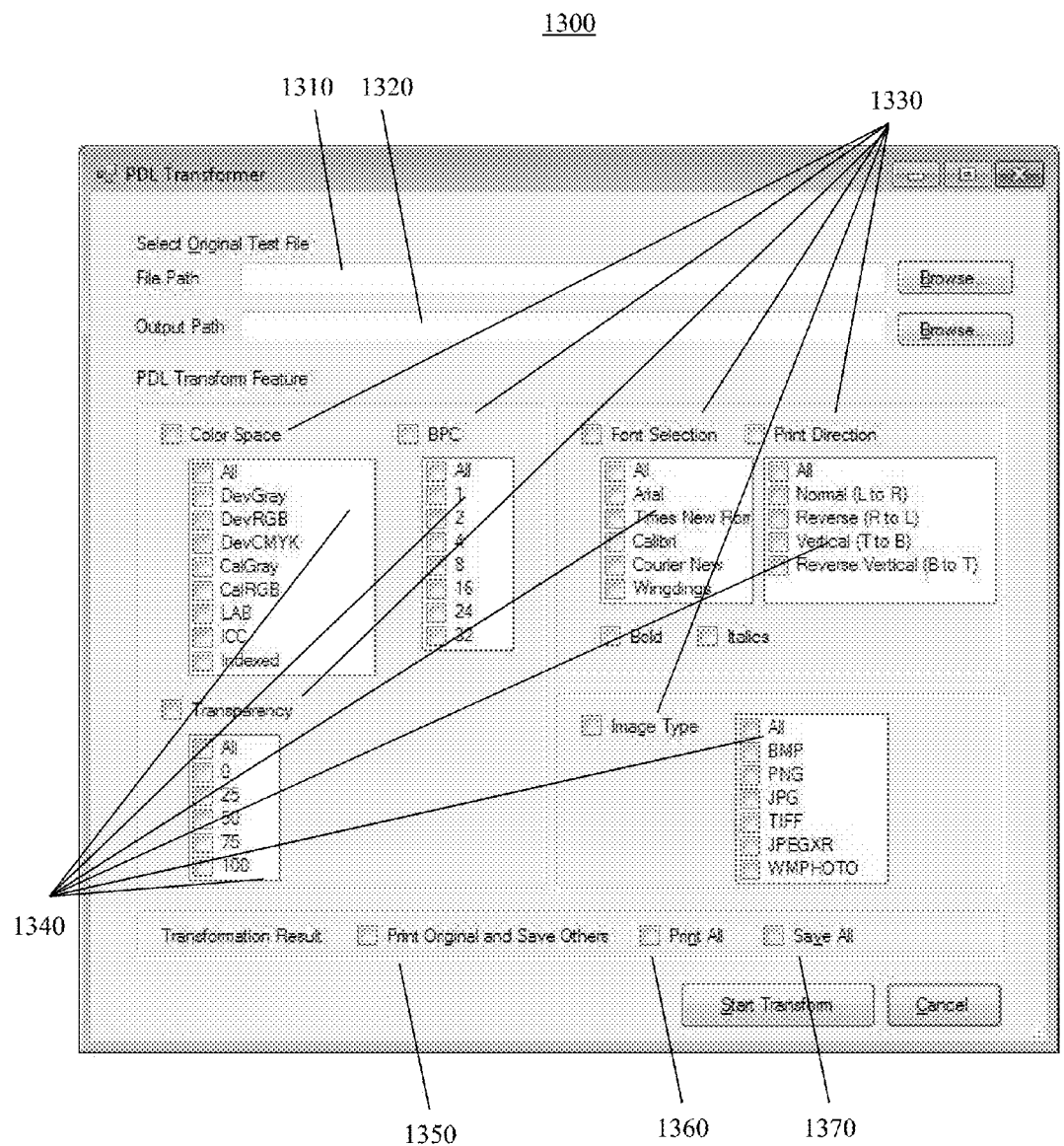
FIG. 13 shows an example desktop application user interface for a method of generating transformed print jobs in accordance with one or more embodiments of the present invention.

FIG. 13 shows an example desktop application user interface 1300 for a method of generating transformed print jobs in accordance with one or more embodiments of the present invention. The user may launch the stand-alone desktop application (150 of FIG. 2) and invoke the desktop application (150 of FIG. 2) user interface 1300. In the desktop application (150 of FIG. 2) user interface 1300, the user may select the input print job 1310 and the output path 1320 for the transformed print jobs generated. The user may select one or more transformation features 1330 and one or more transformation feature settings 1340 to generate the transformed print jobs. The user may also have the option of selecting the type of output. For example, the user may select to print the original print job and save the transformed print jobs generated 1350, print the original print job and all transformed print jobs 1360, or save the original print job and all transformed print jobs to storage 1370.

Figure 14:
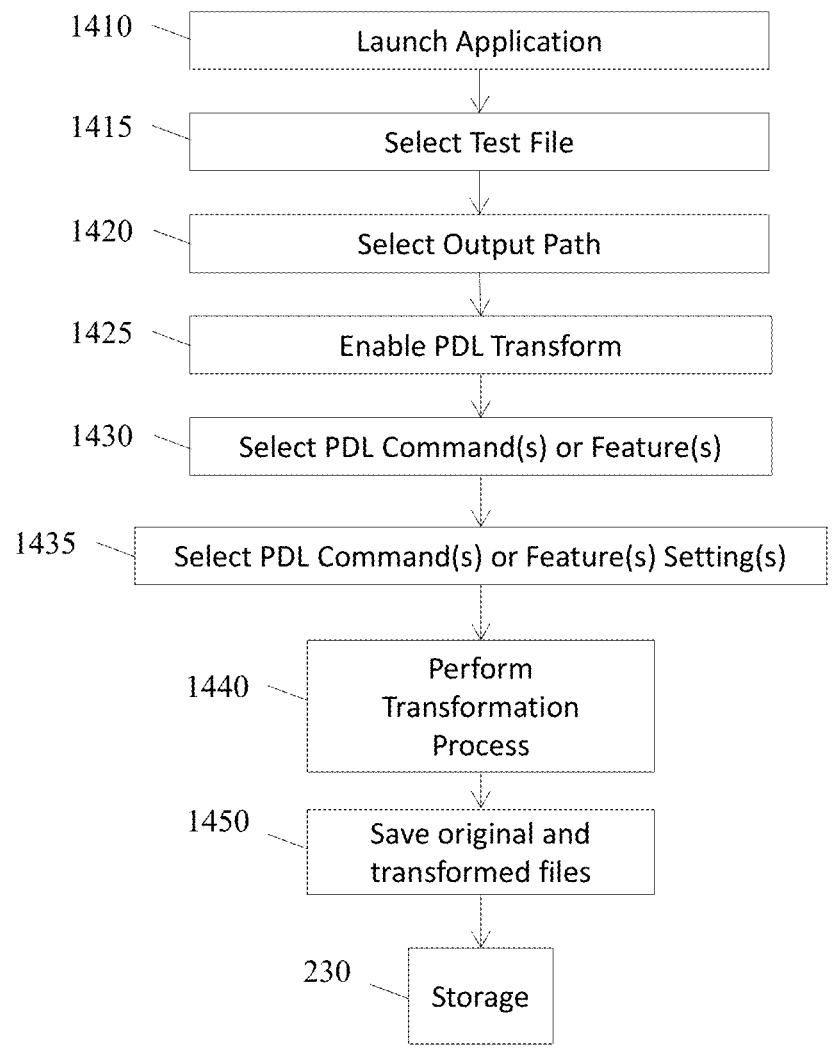
FIG. 14 shows a workflow for a desktop application implemented method of generating transformed print jobs in accordance with one or more embodiments of the present invention.

FIG. 14 shows a workflow 1400 for a desktop application (150 of FIG. 2) implemented method of generating transformed print jobs in accordance with one or more embodiments of the present invention. In step 1410, a user may launch the stand-alone desktop application to invoke the desktop application (150 of FIG. 2) user interface (e.g., 1300 of FIG. 13). In step 1415, the user may select the test file, or input print job, to be used to generate the transformed print jobs. In step 1420, the user may select the output path for the generated transformed print jobs to be stored. In step 1430, the user may select the PDL commands or transformation features that the user wishes to test. In step 1435, the user may select the PDL command or transformation feature settings that the user wishes to test. The dependent transformation features and dependent feature settings may be determined based on their dependency on one or more transformation features. In step 1440, the desktop application (150 of FIG. 2) performs the method of generating transformed jobs by varying the input print job based on the all of the combinations of the selected transformation features, transformation feature settings, dependent transformation features, and dependent feature settings and for each combination, saving a transformed print job to storage 230.

Advantages of one or more embodiments of the present invention may include one or more of the following:

In one or more embodiments of the present invention, a method of generating transformed print jobs transforms a print job into a plurality of variations of the same print job with transformed features or settings.

In one or more embodiments of the present invention, a method of generating transformed print jobs provides for the comprehensive testing of a multi-function printer, firmware, or printer driver by generating transformed print jobs that represent all combinations, or a user selected subset, of features and settings.

In one or more embodiments of the present invention, a method of generating transformed print jobs generates transformed print jobs from an inputted print job that represent all combinations, or a user selected subset, of transformation features, transformation feature settings, dependent transformation features, and dependent feature settings.

In one or more embodiments of the present invention, a method of generating transformed print jobs reduces the amount of time required to test a multi-function printer, firmware, or printer driver by generating a comprehensive suite of transformed print jobs that test all combinations, or a user selected subset, of features and settings.

In one or more embodiments of the present invention, a method of generating transformed print jobs may be automated to reduce or eliminate the need for manual testing by a test engineer. Instead, the test engineer can dedicate his or her time to studying the test results. In addition, the method provides more comprehensive testing that reduces or eliminates the risk of missing a particular combination of features or settings, which often give rise to undiscovered bugs.

In one or more embodiments of the present invention, a method of generating transformed print jobs improves the quality of a multi-function printer, firmware, and printer driver and reduces or eliminates the number of undiscovered bugs and related service issues in the field. Conventionally, multi-function printers, firmware, and printer drivers are shipped with untested combinations of features and settings or features and settings that have not been sufficiently tested. As a consequence, these untested combinations of features and settings often give rise to undiscovered bugs and costly service issues in the field. By generating a comprehensive test suite of transformed print jobs that represent all combinations of features and settings, the method provides comprehensive test coverage that reduces or eliminates the risk of undiscovered bugs and related service issues.

In one or more embodiments of the present invention, a method of generating transformed print jobs reduces the time and expense associated with testing a multi-function printer, firmware, or printer driver as compared to manual testing techniques.

In one or more embodiments of the present invention, a method of generating transformed print jobs allows for faster deployment of new multi-function printers, firmware, or printer drivers as compared to manual testing techniques.

In one or more embodiments of the present invention, a method of generating transformed print jobs improves the quality and scope of test coverage of a multi-function printer, firmware, or printer driver as compared to manual testing techniques.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of generating transformed print jobs to validate a printer, printer driver, or firmware under test comprising:
   inputting a page description language print job;
   receiving a selection of one or more transformation features and one or more transformation feature settings for each selected transformation feature;
   for each transformation feature selected, identifying all dependent transformation features;
   for each dependent transformation feature identified, identifying all dependent feature settings;
   determining all combinations of transformation features, transformation feature settings, dependent transformation features, and dependent feature settings; and
   for each combination, transforming the inputted print job according to the transformation features, transformation feature settings, dependent transformation features, and dependent feature settings of the combination and outputting a transformed print job.

2. The method of claim 1, further comprising:
   outputting the inputted print job.

3. The method of claim 1, further comprising:
   for each transformed print job, determining if the transformed print job requires data truncation, data expansion, dimension resizing, or repositioning adjustments because of the transformation, performing the required data truncation, data expansion, dimension resizing, or repositioning adjustments, and re-outputting the transformed print job.

4. The method of claim 1, wherein transforming the inputted print job according to the combination comprises changing one or more values of the inputted printed job to the corresponding values of the transformation features, transformation feature settings, dependent transformation features, and dependent feature settings of the combination according to PDL transform parameters.

5. The method of claim 1, wherein the one or more transformation features comprise one or more of input color space, foreground color space, background color space, output color space, image format, and font family.

6. The method of claim 1, wherein the one or more transformation features comprise one or more of input color space, foreground color space, background color space, and output color space and the dependent transformation features comprise bits per component, transparency, and resolution.

7. The method of claim 1, wherein the one or more transformation features comprise image format and the dependent transformation features comprise transparency.

8. The method of claim 1, wherein the one or more transformation features comprise font family and the dependent transformation features comprise boldness, italicization, angle, and resolution.

9. The method of claim 1, wherein outputting the transformed print job comprises printing the transformed print job to a multi-function printer or saving the transformed print job to storage.

10. A method of generating transformed print jobs to validate a printer, printer driver, or firmware under test comprising:
inputting a page description language print job;
identifying all transformation features;
for each transformation feature identified, identifying all transformation feature settings and all dependent features;
for each dependent feature identified, identifying all dependent feature settings;
determining all combinations of transformation features, transformation feature settings, dependent features, and dependent feature settings; and
for each combination, transforming the inputted print job according to the transformation features, transformation feature settings, dependent transformation features, and dependent feature settings of the combination and outputting a transformed print job.

11. The method of claim 10, further comprising:
outputting the inputted print job.

12. The method of claim 10, further comprising:
for each transformed print job, determining if the transformed print job requires data truncation, data expansion, dimension resizing, or repositioning adjustments because of the transformation, performing the required data truncation, data expansion, dimension resizing, or repositioning adjustments, and re-outputting the transformed print job.

13. The method of claim 10, wherein transforming the inputted print job according to the combination comprises changing one or more values of the inputted printed job to the corresponding values of the transformation features, transformation feature settings, dependent transformation features, and dependent feature settings of the combination according to PDL transform parameters.

14. The method of claim 10, wherein the one or more transformation features comprise one or more of input color space, foreground color space, background color space, output color space, image format, and font family.

15. The method of claim 10, wherein the one or more transformation features comprise one or more of input color space, foreground color space, background color space, and output color space and the dependent transformation features comprise bits per component, transparency, and resolution.

16. The method of claim 10, wherein the one or more transformation features comprise image format and the dependent transformation features comprise transparency.

17. The method of claim 10, wherein the one or more transformation features comprise font family and the dependent transformation features comprise boldness, italicization, angle, and resolution.

18. The method of claim 10, wherein outputting the transformed print job comprises printing the transformed print job to a multi-function printer or saving the transformed print job to storage.

19. A multi-function printer comprising:
a printing engine;
a human-computer interface;
system memory;
one or more processors; and
a raster image processor firmware comprising an embedded transform component and a PDL interpreter,
wherein the embedded transform component and the PDL interpreter are configured to receive PDL transform parameters,
determine all combinations of transformation features, transformation feature settings, dependent transformation features, and dependent feature settings based on the PDL transform parameters received, and for each combination, transform an inputted print job according to the transformation features, transformation feature settings, dependent transformation features, and dependent feature settings of the combination and output a transformed print job.

20. The multi-function printer of claim 19, the output comprises printing the transformed print job by the multi-function printer or saving the transformed print job to storage.

* * * * *